April 15, 1958 H. LEFLON 2,830,844
WINDSHIELD VISOR FOR AUTOMOBILES
Filed July 18, 1955
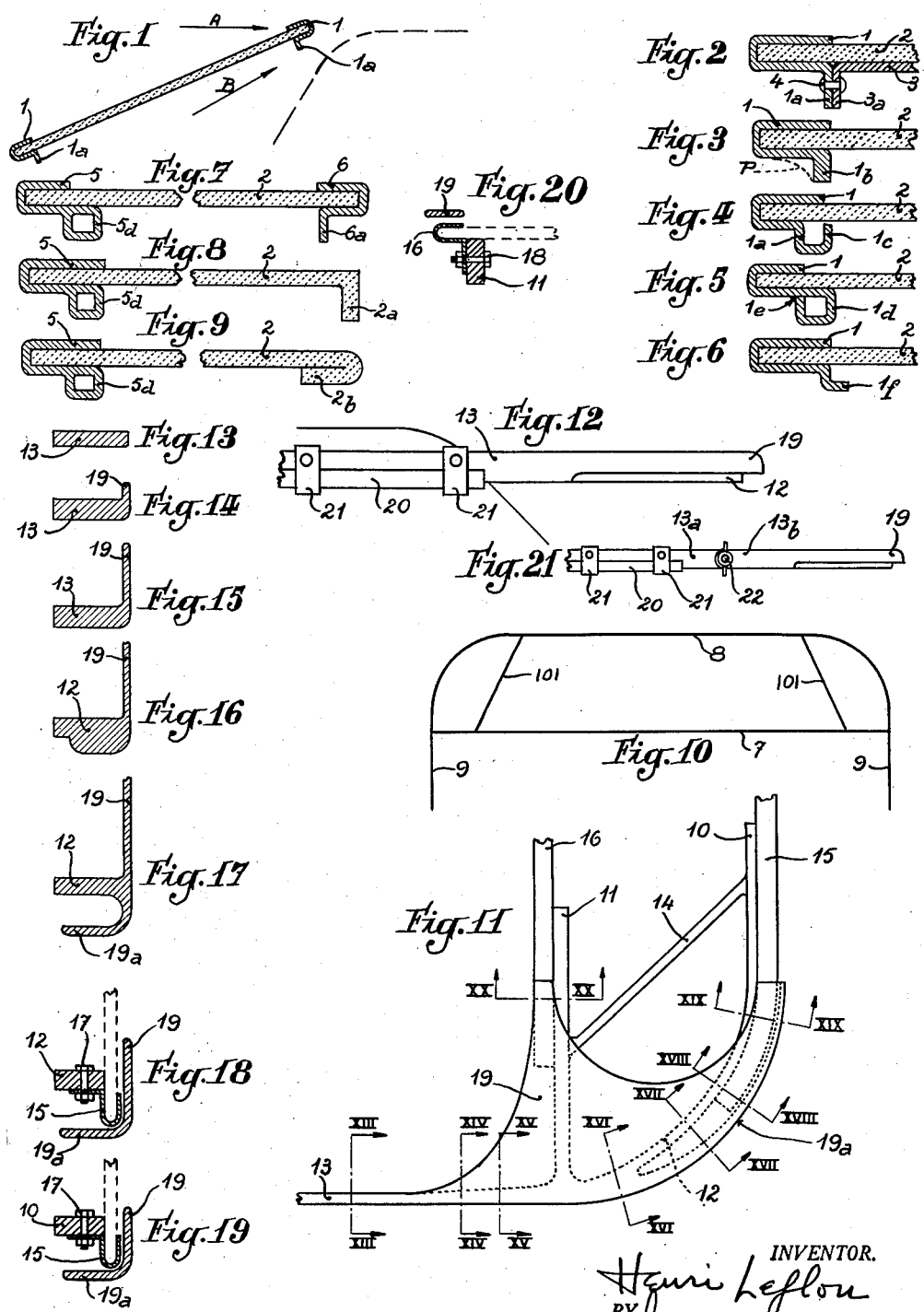

United States Patent Office 2,830,844
Patented Apr. 15, 1958

2,830,844
WINDSHIELD VISOR FOR AUTOMOBILES
Henri Leflon, Lyon, France
Application July 18, 1955, Serial No. 522,801
Claims priority, application France July 20, 1954
8 Claims. (Cl. 296—95)

My invention relates to windshield visors adapted to be disposed in front of the conventional windshield of automobile vehicles and the like to protect the driver and the passengers from the sun or from headlights of other vehicles.

In the known constructions these windshield visors comprise a metal frame supporting a screen plate of dark or coloured material. The frame is formed of two U-shaped transverse members adapted to receive the edges of the plate, the ends of these transverse members being connected together by side members by means of which the screen is fixedly or oscillatably secured to the body of the vehicle. There is generally provided an intermediate longitudinal stay between the two transverse members in the central part of the screen to reinforce the frame.

These windshield visors have to withstand the action of the relative wind when the vehicle is running at high speed and the resulting forces thus applied to the frame may reach very high values. The transverse members of the frame are therefore generally made of very thick metal, whereby the apparatus becomes heavy, expensive and unsightly. The known windshield visors have also to be manufactured in accordance with the width of the vehicle body, which necessitates the provision of a large number of different types corresponding to the various types of existing vehicles.

A first object of my invention is to provide a windshield visor adapted to be positioned in front of the windshield of a vehicle and which will be rigid while being relatively light in weight.

A further object of my invention is to provide a windshield visor which may be manufactured at any width desired by means of standardized elements.

Still another object of my invention is a windshield visor wherein the front transverse member, and eventually also the rear transverse member, comprises a downwardly directed extension below the screen plate.

It will be appreciated that such a downwardly directed extension considerably increases the resistance of the member against bending stresses in a vertical direction which is substantially the direction of the forces resulting from air pressure on the screen plate. This extension may besides be used to secure the ends of the stay or stays connecting the transverse members, the securing bolts or rivets being thus quite invisible under the screen plate.

The downwardly directed extension of each transverse member is preferably thicker than the other parts of the cross section of the member. It may be straight and relatively short or it may be formed with folded portions adapted to increase its stiffness. For instance the turned down edge may be L or U-shaped in cross-section, or even it may be quite tubular.

The front transverse member is preferably provided stronger than the rear one which may even be omitted in some cases.

The transverse members are preferably assembled together by means of side brackets, each in the form of a rigid unit comprising a front and a rear transverse member adapted to receive the ends of the front and rear transverse members of the frame. This unit may comprise a cover plate covering the lateral end of the transparent or opaque plate of the screen. The strength of this unit may be considerably increased by providing oblique cross bars to connect the front and rear transverse members of each side bracket.

In the annexed drawings:
Fig. 1 is a diagrammatical longitudinal section of a windshield visor according to my invention disposed in front of the windshield of a vehicle.
Fig. 2 is an enlarged cross-section of the front transverse member of this windshield visor.
Figs. 3 to 6 illustrate possible modifications of this front transverse member.
Fig. 7 is an enlarged fragmental longitudinal section of another embodiment of a windshield visor wherein the rear transverse member is different from the front transverse member.
Figs. 8 and 9 illustrate two possible embodiments of a windshield visor wherein the rear transverse member has been dispensed with.
Fig. 10 is a diagrammatical plan view showing the general arrangement of a reinforced screen frame according to my invention.
Fig. 11 is a plan view showing one of the side brackets of a windshield visor according to my invention with the ends of the transverse members of the frame secured thereto, the screen plate being supposedly removed.
Fig. 12 is the corresponding side view illustrating the manner in which the side bracket is secured onto the vehicle body.
Figs. 13 to 19 are enlarged fragmental sections taken along lines XIII—XIII to XIX—XIX of Fig. 11, these sections being disposed in a single row for a clearer understanding of the arrangement of the parts.
Fig. 20 is an enlarged fragmental section taken along line XX—XX (Fig. 11).
Fig. 21 is a side view illustrating a windshield visor of the same general type as Fig. 12, but which may be tilted at will.

The windshield visor shown in longitudinal section in Fig. 1 comprises a frame formed of two transverse members 1 connected at both ends by appropriate side members which will be hereinafter described. This frame supports a screen plate 2 which may be made for instance of a coloured transparent thermoplastic substance. The transverse members 1 are in the form of metal bands of U-shaped cross-section adapted to engage the transverse edges of plate 2 and in accordance with my invention each member 1 comprises a downwardly extending portion 1a. Such an arrangement considerably increases the stiffness of the transverse members whereby it is possible to obtain a very rigid screen frame with metal bands of relatively reduced thickness.

Another important advantage of the above described arrangement is that it considerably facilitates the provision of longitudinal stays to reinforce the screen frame when this is required. As illustrated in Fig. 2 the ends of the stay 3 are turned down as shown at 3a and they are easily bolted or riveted to the downwardly extending portion 1a of the transverse members, as indicated at 4. The bolts or rivets 4 are wholly concealed under the screen and are quite invisible.

In the modification of Fig. 3 the downwardly extending portion 1b is substantially thicker than the U-shaped portion of the cross-section of the transverse member. Such a profile may be obtained by drawing a metal bar through appropriate dies, or by folding at 180° on itself the edge 1a of Fig. 1 and by welding together the folded and the unfolded portions.

When the profile of Fig. 3 is obtained by drawing it may be of advantage to increase progressively the thickness along the lower branch of the U as indicated in broken lines at P.

Fig. 4 shows a transverse member wherein the downwardly extending portion 1a has been folded on itself at 180° to form an upwardly extending end 1c which is however spaced from the unfolded portion 1a. There is thus obtained a lower U-shaped hollow rib which is extremely rigid.

In the embodiment of Fig. 5 the extension has been bent twice at 90° to form a rectangular tube 1d which is preferably closed longitudinally by welding as at 1e. Such a tubular construction affords a considerable rigidity.

In Fig. 6 the downward extension has been bent at 90° to form an angle or L-shaped cross-section 1f.

It will be appreciated that Figs. 2 to 6 are only illustrative of some possible constructions, but that they do not limit the ambit of my invention, since any one skilled in the art may easily imagine other forms for the cross-section of the turned down edge.

It will be noted that in the embodiments of Figs. 3 or 6 when the frame comprises longitudinal stays the latter may be secured as shown in Fig. 2. In the case of Figs. 4 and 5 the same arrangement may also be used by providing in the left hand portion of the turned down edge a hole of sufficient diameter for the passage of the head of the rivet or bolt 4.

As above indicated the action of the relative wind on a windshield visor as illustrated in Fig. 1 is at a maximum along the front edge of the screen, while it is relatively small along the rear edge thereof. This may be explained as follows: The direct wind indicated by arrow A exerts a substantially regular downward pressure on the whole surface of the screen plate. But the movement of the vehicle also creates a draught B which passes through the wedge-shaped space between the screen and the vehicle body. This draught develops on the screen an upward pressure but the latter is not regular owing to the decreasing width or height of the space through which the air passes. The upward pressure is small and quite negligible along the front edge of the screen, while along the rear edge thereof it reaches a substantially high value and balances the action of the direct wind A. The strains which the rear transverse member has to support are therefore relatively small and in my improved windshield visor this rear transverse member may be made weaker than the front transverse one. Fig. 7 illustrates a screen wherein the front transverse member 5 is of the extremely strong type shown in Fig. 5, i. e. with a tubular lower extension 5a, while the rear transverse member 6 is of the type of Fig. 1, i. e. with a flat extension 6a which is substantially less resistant to bending stresses.

The rear transverse member may also be made of a thinner metal, and its lower extension may be relatively short, etc. In some instances the rear transverse member may even be fully dispensed with, which simplifies the construction, reduces the weight and improves the general appearance. In such a case the rear edge of the screen plate 2 may eventually be reinforced, for instance by turning down at 90° as indicated as 2a in Fig. 8, or even by completely folding the said edge on itself at 180°, as illustrated at 2b in Fig. 9.

In the known windshield visors for automobiles the screen frame is generally reinforced in its central portion and along the rear edge thereof. But experiments have demonstrated that the air pressure is much higher on the sides of the screen than in the central zone. According to my invention the sides of the windshield visor are made much stronger than the central portion thereof.

The screen frame may comprise a rear transverse member 7 (Fig. 10) and a front transverse member 8 the ends of which are bent at 90° as shown to form longitudinal extensions 9 directed rearwardly, such extensions forming the sides of the frame and being used to secure the said frame to the vehicle body. Oblique cross bars 101 are disposed each side of the frame to connect the front and rear transverse members. These cross bars considerably reinforce the sides of the frame.

In order to obtain still a stronger construction under a reduced weight, the frame may be made of two side brackets connected together by separate transverse members. In such an embodiment the transverse members are established according to any of the above described examples to receive the screen plate, while the side brackets only have to support and to rigidly connect the said transverse members. Another advantage of such an arrangement is that it greatly facilitates the establishment of a windshield visor adapted to any width of vehicle. In the construction illustrated in Figs. 11 to 20 each side bracket is a one-piece casting embodying two transverse portions 10 and 11 which may be considered respectively as the ends of the front and transverse members of the screen frame. Portion 10 is bent rearwardly at 90° as shown at 12 to form the side of the frame and it extends in the form of a longitudinal extension 13. Portions 10 and 11 are connected together by an oblique cross bar 14. Portion 10 is adapted to receive the curved end of a front transverse member 15 of the kind illustrated in Figs. 1 and 2, while portion 11 receives the straight end of a rear transverse member 16 of the same type. Transverse members 15 and 16 may be secured by means of bolts, as indicated at 17 and 18 (Figs. 18 and 20). The screen plate has not been shown in Fig. 11 and it is only indicated in broken lines in Figs. 18, 19 and 20.

The side bracket illustrated in Figs. 11 to 20 also comprises a cover plate 19 adapted to conceal the ends of transverse members 15 and 16, as clearly shown in the plan view of Fig. 11. Plate 19 has a turned down portion 19a (Figs. 17, 18 and 19) which extends along the edge of the screen frame. Since this plate 19 is in one with the other portions of the side bracket, it forms at the same time a very effective reinforcement of the latter in the side part of the frame. The successive enlarged sections of Figs. 13 to 19, arranged on the same row, clearly show the general arrangement and relation of the various parts of the bracket.

It will be appreciated that I could as well provide cover plate 19 in the form of a separate member screwed, bolted or otherwise secured onto parts 10, 11, 12, 13.

The side bracket of Figs. 11 to 20 may be secured onto the car body as indicated in Fig. 12. In this figure 20 designates the conventional lateral rain water collecting gutter of the vehicle body. The rear end of the extension 13 is disposed in this gutter and it is fixed thereto by means of plates 21 which are screwed to the said extension, the said plates having their lower marginal portion bent at 90° to form a hook adapted to engage the lower side of gutter 20.

In some instances it may be desired that the windshield visor may be tiltable. This is easily obtainable by making the rearward extension 13 of each side bracket of the screen in two parts 13a, 13b (Fig. 21) articulated with each other by means of a bolt 22 provided with a clamping nut 23 or like device.

I claim:

1. A visor adapted to be disposed in front of the windshield of an automobile vehicle, comprising in combination a screen plate; a front transverse member having a U-shaped cross-section opening rearwardly to receive the front edge of said screen plate; a rear transverse member having a U-shaped cross section opening forwardly to receive the rear edge of said plate; and two side brackets each comprising a front transverse portion onto which one end of said front transverse member is secured, a rear transverse portion onto which one end of said rear transverse member is secured, a side portion connecting said rear and front transverse portions and extending rearwardly to be secured to the body of said automobile vehicle, an oblique cross-bar also connecting said front and rear transverse portions at a distance from said side portion, and a cover plate extending over said rear and front transverse portions and said side portion to conceal same, said rear and front transverse portions, said side portion, said bar and said cover plate being in the form of a single rigid casting.

2. In a visor as set forth in claim 1, the lower branches of the U of said transverse members having downwardly directed extensions to reinforce said transverse members against vertical bending stresses; the rear transverse member being substantially weaker than the front transverse member.

3. In a visor as set forth in claim 1, the lower branch of the U of said front transverse member having a downwardly directed extension of substantially increased thickness with respect to the remaining portion of the cross-section.

4. In a visor as set forth in claim 3, said downward extension being L-shaped.

5. A visor adapted to be disposed in front of the windshield of an automobile vehicle, comprising a screen plate; a front transverse member having a U-shaped cross-section opening rearwardly to receive the front edge of said screen plate; a rear transverse member having a U-shaped cross-section opening forwardly to receive the rear edge of said screen plate; two side brackets each comprising a front transverse portion onto which one end of said front transverse member is secured, a rear transverse portion onto which one end of said rear transverse member is secured, and a side portion connecting said rear and front transverse portions and extending rearwardly to be secured to the body of said automobile vehicle; and two cover plates each adapted to be fixed to one of said side brackets to extend over the front and rear transverse portion thereof to conceal same.

6. In a visor as set forth in claim 5, the lower branches of the U of said transverse members having downwardly directed extension to reinforce said transverse members against vertical bending stresses; the rear transverse member being substantially weaker than the front transverse member.

7. In a visor as set forth in claim 5, the lower branch of the U of said front transverse member having a downwardly directed extension of substantially increased thickness with respect to the remaining portion of the cross-section.

8. In a visor as set forth in claim 7, said downward extension being L-shaped.

References Cited in the file of this patent

UNITED STATES PATENTS

| | | |
|---|---|---|
| 1,421,182 | Dickinson | June 27, 1922 |
| 1,496,766 | Bechtel | June 10, 1924 |
| 1,502,382 | Gribsby | July 22, 1924 |
| 1,816,783 | Mason | July 28, 1931 |
| 2,470,477 | Ellithorpe | May 17, 1949 |
| 2,628,807 | Lincoln | Feb. 17, 1953 |
| 2,681,700 | Krusemark | June 22, 1954 |